United States Patent [19]

Zdrahala et al.

[11] Patent Number: 4,647,643

[45] Date of Patent: Mar. 3, 1987

[54] SOFT NON-BLOCKING POLYURETHANES

[75] Inventors: Richard J. Zdrahala, Dayton; David Spielvogel, Springboro, both of Ohio

[73] Assignee: Becton, Dickinson and Company, Franklin Lakes, N.J.

[21] Appl. No.: 796,387

[22] Filed: Nov. 8, 1985

[51] Int. Cl.$^4$ .............................................. C08G 18/38
[52] U.S. Cl. ...................................... 528/28; 528/906
[58] Field of Search ................................. 528/28, 906

[56] References Cited

U.S. PATENT DOCUMENTS

| 4,033,912 | 7/1977 | Kleimann et al. | 528/28 |
| 4,057,595 | 11/1977 | Raunor et al. | 525/460 |
| 4,076,763 | 2/1978 | Thom et al. | 528/28 |

*Primary Examiner*—Maurice J. Welsh
*Attorney, Agent, or Firm*—R. P. Grindle

[57] ABSTRACT

Soft, non-blocking, thermoplastic polyurethanes are prepared by reacting a long chain polyester or polyether diol, a short chain diol, a diisocyanate and a silicone diol of the formula:

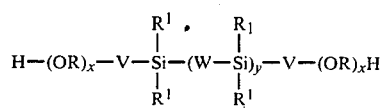

wherein x has a value of about 1 to 30, y has a value of about 1 to 200, R is an alkylene group having 2 to 4 carbon atoms, $R^1$ is selected from the group consisting of an alkyl group having 1 to 18 carbon atoms, a haloalkyl group having 1 to 18 carbon atoms, a phenyl group, a substituted phenyl group, or a phenylalkyl group, and V and W are divalent linking groups. A unique feature of the invention is that the polymers exhibit, less blocking, are less susceptible to hydrolysis and are highly transparent. These polyurethanes are particularly useful in fabricating medical tubing.

23 Claims, No Drawings

SOFT NON-BLOCKING POLYURETHANES

BACKGROUND OF THE INVENTION

The present invention relates to a soft, non-blocking polyurethane and, more particularly, to a soft, non-blocking thermoplastic polyurethane which is useful in medical and surgical devices.

A number of polymeric materials have been investigated for use in the fabrication of medical devices. One of these materials, silicone rubbers, although widely used, is disadvantageous because large amounts of reinforcing fillers and other additives such as plasticizers, catalysts, and the like are added to the polymer to achieve adequate physical properties such as tensile and tear strength.

As a result of several limitations, silicone rubber tubing is not suitable for use in the body for a prolonged period. Certain additives are susceptible to being extracted by body fluids. This is not only a potential source of contamination, but, absent the additive, there is a tendency for devices made from silicone rubbers to lose their shape and physical properties. The fillers used in silicone rubber are also a potential source of contamination and have been known to induce thrombosis. A further disadvantage of silicone rubber is that due to its limited physical-mechanical properties, a relatively large wall thickness is required in medical tubing and the like to achieve adequate strength and kink resistance. Silicone rubber cannot be used to fabricate finer diameter medical tubing having a narrow wall thickness.

Polyurethanes have arisen as a particularly desirable replacement for silicone rubber in certain applications. One disadvantage of polyurethane resins of the softness desired for many medical devices, e.g., resins having Shore A hardness less than 100, is surface blocking (tack) after extrusion or molding into desired shapes. To avoid this problem, many remedies have been developed in the art including the use of external mold release agents and the use of various antiblockers or detackifiers in admixture with the polymer. Most antiblocking agents/detackifiers are low molecular weight materials which have a tendency to migrate out or to leach (extract) out from the bulk/surface of the polymer. This represents a problem when polyurethanes when used as biomaterials (tubing, prostheses, implants, etc.). The presence of such low molecular weight extractables could effect their biocompatibility, hemocompatibility and surface degradation (fissuring, stress-cracking).

Although not related to biomaterials, U.S. Pat. No. 4,057,595 to Rauner et al. teaches the use of other compounds of detackifiers. This patent discloses a method for modifying the physical characteristics of polyurethane elastomers, particularly Spandex fibers, to reduce blocking, wherein the polyurethane contains, within the polymer chain, a siloxane-polyoxyalkylene block copolymer of the formula

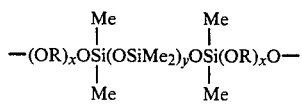

wherein x has an average value of 3 to 45, y has an average value of 8 to 198, Me is a methyl radical and R is an alkylene radical. These silicone modified polyurethanes contain an Si—O—C linkage which makes them less than completely satisfactory for certain medical applications. The Si—O—C linkage is susceptible to hydrolysis. Upon prolonged exposure to body fluids, these polyurethanes have a tendency to lose their physical characteristics.

Accordingly, there is a need in the art for relatively soft polyurethane resins that are non-tacky, non-toxic, and which are thermoplastic so that they can be readily fabricated into medical devices such as tubing, surgical dressings, intravenous solution bags, implant devices, and the like.

SUMMARY OF THE INVENTION

One embodiment of the present invention resides in soft, non-blocking, thermoplastic polyurethane resins which contain within the polymer chain units of a siloxane-polyoxyalkylene block copolymer of the formula (I) and, more preferably, the formula (II) below:

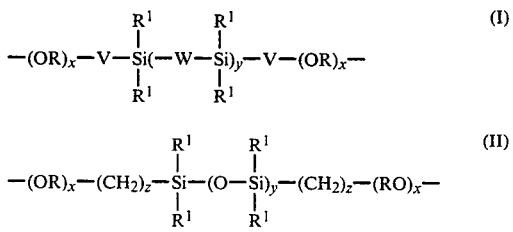

wherein x has a value of about 1 to 30; y has a value of about 1 to 200, preferably 20 to 50, and more preferably 10 to 30; z is an integer of 2 or more and preferably 2 to 4; R is an alkylene group having 2 to 4 carbon atoms; and $R^1$ is selected from the group consisting of an alkyl group having 1 to 18 carbon atoms, a haloalkyl group having 1 to 18 carbon atoms, a phenyl group, a substituted phenyl group, and a phenylalkyl group; and V and W are divalent linking groups. In the most preferred embodiments of the invention, $R^1$ is methyl and R is ethylene or butylene. The preferred polyurethanes of the present invention are characterized by a Shore A hardness of about 55 to 90.

Another embodiment of the present invention resides in a medical device fabricated from the polyurethane of the present invention and, more particularly, in a catheter.

A still more particular embodiment of the present invention resides in a catheter fabricated from the polyurethanes of the present invention in which the wall thickness is as low as 0.25 to 0.50 mm.

Still another object of the present invention is to provide a soft, non-blocking polyurethane having improved clarity which is useful in fabricating catheters, wound dressings and surgical drapes.

The polyurethanes of the present invention are also advantageous because they can be easily prepared in a one-stage polymerization without solvent. Thus, another embodiment of the invention resides in a process for making a soft, non-blocking polyurethane comprising:

(a) forming a diol mixture including a short chain diol, a long chain polyether and/or polyester diol, and a silicone diol of the formula (III) and, more preferably, the formula (IV)

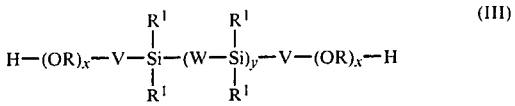

$$H-(OR)_x-V-\underset{R^1}{\overset{R^1}{\underset{|}{\overset{|}{Si}}}}-(W-\underset{R^1}{\overset{R^1}{\underset{|}{\overset{|}{Si}}}})_y-V-(OR)_x-H \quad \text{(III)}$$

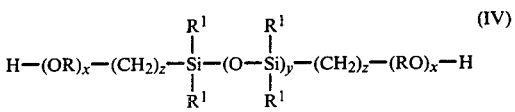

$$H-(OR)_x-(CH_2)_z-\underset{R^1}{\overset{R^1}{\underset{|}{\overset{|}{Si}}}}-(O-\underset{R^1}{\overset{R^1}{\underset{|}{\overset{|}{Si}}}})_y-(CH_2)_z-(RO)_x-H \quad \text{(IV)}$$

where x, y, z, R, $R^1$, V and W are defined as above, (b) adding a diisocyanate to said diol mixture, (c) stirring said mixture to prevent separation thereof while said mixture reacts and forms a polyurethane, and (d) recovering said polyurethane.

Still another embodiment of the present invention relates to a process for making a soft, non-blocking polyurethane from a quasi prepolymer comprising:

(a) reacting a diisocyanate with a silicone diol of the formula (III) or (IV) to form a prepolymer, (b) adding said prepolymer to a mixture of a short chain diol and a long chain polyether or polyester diol, and (c) recovering said polyurethane.

DETAILED DESCRIPTION OF THE INVENTION

Silicone diols of the formulas (III) and (IV) are known products which can be prepared by synthetic methods reported in the art wherein a silane of formula (V) is reacted with an unsaturated polyalkylene oxide of the formula (VI).

$$H-\underset{R^1}{\overset{R^1}{\underset{|}{\overset{|}{Si}}}}-(WSi)_y-H \quad \text{(V)}$$

$$HO-(RO)_x-V' \quad \text{(VI)}$$

where R, $R^1$, x, y, and W are defined as above and V' is an olefinic group. While the synthesis permits the use of a variety of olefinic groups including cyclic or straight chain olefins in which the unsaturated bond is terminal or mid chain; typically V' is an ethylenically unsaturated group such as a vinyl group or an alkyl group such that V is a divalent alkylene group of the formula $-(CH_2)_z$ where z is an integer of 2 or more, and more typically 2 to 4.

The compounds are reacted in a mole ratio (V:VI) of about 1:2. The reaction proceeds in the presence of a catalyst such as chloroplatinic acid at 23° to 150° C. with the silane (V) adding across the unsaturated bond in compound (VI). A small amount of unreacted compound (VI) is present in the diol because the reaction does not go to completion. If the diol is used in the polyurethane in amounts less than 10 weight percent of the polyurethane, the small amount of unreacted (VI) in the diol does not detract from the physical properties of the polyurethane. If the diol is used in amounts greater than 10 weight percent, it is desirable to purify it to remove unreacted low molecular weight compound.

With reference to formulae (I) through (VI), $R^1$ is typically methyl, R is typically ethylene, W is typically an oxo linkage, and V is an alkylene group. However, other silicone diols within the scope for formula (III) may be used. The present invention also includes polymers in which the linking group W is a divalent radical other than oxo such as an alkylene bridge of from 1 to 4 carbon atoms (e.g., methylene or ethylene) or an arylene group such as phenylene.

Representative examples of the alkyl groups represented by $R^1$ include ethyl and propyl as well as methyl. In addition to alkyl groups, $R^1$ can also represent a halogenated alkyl group such as a chloromethyl group or a chloropropyl group; a phenyl group; a substituted phenyl group such as a tolyl group or a 4-chloromethylphenyl group; and a phenylalkyl group such as benzyl.

Representative examples of the alkylene group represented by R include propylene and butylene, as well as ethylene. From consideration of the synthesis, those skilled in the art will appreciate that the silicone diol may include a mixture of R groups such as a combination of ethylene and butylene groups.

The silane (V) and the polyether (VI) are known compounds available through syntheses generally known in the art.

A presently preferred silicone diol for use in the invention is a product commercially available from Dow Corning Corp. under the designation 4-3667 Fluid (formerly Q4-3667). In 4-3667 Fluid, x has an average value of about 12, y has an average value of about 15, z is 3, R is an ethylene group, $R^1$ is a methyl group, and W is oxo. The product is supplied as an essentially anhydrous liquid having the following properties:

| Appearance | Hazy liquid to paste |
|---|---|
| Color, Gardiner | 2-3 |
| % Active Ingredients | 100% |
| Viscosity @ 40° C. cst | 300 cst |
| % Primary Hydroxyl | 1.7% |
| Number of OH sites/molecule | 2 |
| Average Hydroxyl equivalent wt. | 1,200 |
| Specific Gravity | 1,038 |
| Flash Point, c.c. °F. | 160° F. |
| Refractive Index | 1.4382 |
| Pour Point, °C. | 13° C. |

A critical feature of the present invention is that the silicone diol employed in the preparation of the polyurethane resins of the invention contains no —Si—O—C— bonds. The absence of such chemical bonds is important in that such bonds are subject to hydrolysis when in contact with body fluids such that polyurethanes containing such bonds lose their physical properties upon prolonged residence in the body.

As a general rule, the polyurethanes of the present invention are easily prepared by forming a diol mixture containing the short chain diol, a long chain polyether or polyester diol and the silicone diol of formula (III) or (IV) and adding the diisocyanate to the diol mixture. Catalysts conventionally used in the synthesis of polyurethanes, such as dibutyl tin dilaurate, may be used but are preferably avoided for biocompatability. There is a tendency for the silicone diol to be insoluble in the other diols. Stirring the mixture sufficiently prevents phase separation of the components. If phase separation of the silicone diol is a problem, the silicone diol can be pre-reacted with the diisocyanate to produce a quasi prepolymer (isocyanate terminated silicone diol) which is more soluble in the long chain diol and the short chain diol extender and readily reacts with them to provide the polyurethane. The mixture is heated to mild temperatures, generally in the 60°–70° C. range, to promote the reaction between the hydroxyl groups and the isocyanate groups. No solvent is required. After the mixture has thickened considerably, it is poured into trays (preferably lined with polytetrafluoroethylene) and heated for about 1 hour at 125° C.

The long chain diol included in the polyurethane resins of the invention may be either a long chain polyether diol or a long chain polyester diol. Both types are well known in the art and are widely used in the manufacture of polyurethane resins. It is believed that the polyester diols are capable of providing lower tack than the polyether diols. The long chain diols typically have average molecular weights from approximately 500 to 5000. Diols of molecular weight less than 1000 tend to result in more tack. Diols of 1000 to 3000 molecular weight give the optimum combination of low tack and good mechanical properties. The diols preferably have primary hydroxyl groups in preference to secondary hydroxyl groups.

Representative examples of suitable long chain polyether diols are polylactones, such as polycaprolactone glycol, and copolymers of short chain diols and aliphatic dicarboxylic acids, such as poly(ethylene adipate) glycol, poly(ethylene succinate) glycol, poly(ethylene sebacate) glycol, poly(butylene adipate) glycol, poly(ethylene butylene adipate) glycol, poly(diethylene ether adipate) etc. The polyester glycols preferably are derived from short chain diols, preferably primary diols and mixtures of primary diols having 2 to 4 carbon atoms and an aliphatic dicarboxylic acid having 4 to 10 carbon atoms.

Polyether diols which can be used in the present invention include the polyalkylene glycols. Two polyether diols that are presently preferred for use in the present invention are poly(tetramethylene ether) glycols having molecular weights in the range of 1000 to about 2000. Such polyols are commercially available as Polymeg 1000 (Quaker Oats Co., Chemical Division) and Terathane T-1000 (DuPont).

The short chain diol included in the polyurethane resins of the invention preferably contains 2 to 6 carbon atoms in its chain. Suitable examples include ethylene glycol, 1,3-propylene glycol, 1,4-butane diol, neopentyl glycol, etc. Other short chain diols which can be employed are alicyclic glycols having up to 10 carbon atoms, e.g., 1,4-cyclohexane diol, 1,4-dimethylol cyclohexane, etc.

Representative diisocyanates useful in the present invention include aromatic and alicyclic diisocyanates, such as 4,4-diphenyl methane diisocyanate (MDI), toluene diisocyanate (TDI), isophorone diisocyanate (IPDI), methylene bis (4-cyclohexyl isocyanate) (HMDI), etc. Of these, MDI and HMDI are presently preferred.

The four components included in the novel polyurethane resins of the invention are present within certain preferred proportions. The siloxane-polyoxyalkylene block copolymer of formulae (I) and (II) is present in the amount of about 1 to 15 weight percent, preferably, from about 3 to 10 weight percent, and more preferably, about 5 to 10 weight percent of the product. Oxygen and moisture vapor permeability of films of the polyurethane increase as the silicone content increases. Polyurethane containing higher silicone contents within the aforementioned ranges are desirable for use in fabricating wound dressings.

The diisocyanate and the short chain diol are included in the combined amount of 25 to 45 weight percent of the product, and preferably, about 27 to 36 weight percent of the product. These two components are sometimes referred to as constituting the "hard segment" of the product. The diisocyanate generally will be included in an amount such that 1.0 to about 1.02 isocyanate group will be present for each hydroxyl group present in the silicone diol, the long chain diol and the short chain diol. That is, the diisocyanate is present in a slight stoichiometric excess.

The long chain polyether diol or the long chain polyether diol or a mixture of the two diols constitutes the balance of the polyurethane resin.

The polyurethane resins of the invention contain the components within the proportions previously stated such that they have Shore A hardness values of less than about 100, preferably in the desired range of about 55 to 90, and more preferably 60 to 80. The resins will be non-tacky and will not readily "block" when fabricated into film and tubing.

The polyurethane resins of the invention can be fabricated into film, tubing and other forms by conventional thermoplastic fabricating techniques including solution casting, extrusion molding, etc. The resin may have incorporated therein, as desired, conventional stabilizers, radiopaque materials, and the like. The amounts of these materials will vary depending upon the application of the polyurethane, but they are typically present in amounts ranging from about 25 to 40 weight percent of the polymer.

The following examples are set forth to illustrate the principle and practice of the invention to those skilled in the art. Unless otherwise indicated, parts and percentages are expressed on a weight basis.

EXAMPLES 1–11

A series of polyurethane resins were prepared from 4-3667 Fluid, Terathane T-1000, MDI and 1,4 butanediol (BDO). The diols, i.e., the 4-3667 Fluid, Terathane T-1000 and BDO were mixed, heated to 65±3° C., and vacuum stripped for a minimum of 15 minutes until the cessation of bubbling was noted. The MDI then was added and the mixture was stirred to prevent phase separation of the liquid mixture. After about 1 to 3 minutes, the temperature increased to about 80° C. The liquid mixture then was poured into polytetrafluoroethylene lined trays and heated to 125° C. for about 1 hour to complete the polymerization. After cooling to ambient temperature, the resins were chipped and heated in a vacuum oven at 65° C. to reduce the moisture level to below about 0.05%.

Each of the resins was then extruded into film for measurement of physical properties. The results are shown in Table I.

As controls, a series of three resins were prepared in which the 4-3667 Fluid was omitted and replaced with a like quantity of Terathane T-1000. The results also are included in Table I.

As compared with the silicone rubbers employed for use in medical applications, e.g., Silastic MDF 0372 supplied by Dow Corning Corporation, the resins of the invention have superior tensile values and greater elongations at break. In addition, they have the advantage that they can be readily sealed by heat and/or solvents.

TABLE I

| Resin Identification | Control A | Example 1 | Example 2 | Control B | Example 3 | Example 4 | Control C | Example 5 | Example 6 | Example 7 | Example 8 | Example 9 | Example 10 | Example 11 |
|---|---|---|---|---|---|---|---|---|---|---|---|---|---|---|
| Resin Components | | | | | | | | | | | | | | |
| Q4-3667 | — | 3 | 5 | — | 5 | 10 | — | 3 | 5 | 7.5 | 10 | 10 | 10 | 7 |
| Terathane T-1000 | 73 | 70 | 68 | 70 | 65 | 60 | 66 | 63 | 61 | 58.5 | 56 | 55 | 54 | 53 |
| BDO | 2.2 | 2.3 | 7.0 | 3.0 | 3.2 | 3.4 | 4.5 | 4.6 | 4.6 | 4.8 | 4.8 | 5.1 | 5.4 | 6.6 |
| MDI | 24.8 | 24.7 | 20 | 27 | 26.8 | 26.6 | 29.05 | 29.4 | 29.4 | 29.2 | 29.2 | 29.9 | 30.6 | 33.4 |
| Isocyanate Index[1] | 1.02 | 1.02 | 1.02 | 1.02 | 1.02 | 1.02 | 1.02 | 1.02 | 1.02 | 1.02 | 1.02 | 1.02 | 1.02 | 1.02 |
| Wt. % Hard Segment[2] | 27 | 27 | 27 | 30 | 30 | 30 | 34 | 34 | 34 | 34 | 34 | 35 | 36 | 40 |
| Properties | | | | | | | | | | | | | | |
| Shore A Hardness | 64 | 62 | 59 | 68 | 61 | 65 | 78 | 79 | 75 | — | — | — | — | — |
| Shore D Hardness | 21 | 20 | 18 | 25 | 21 | 24 | 34 | 33 | 31 | 31 | 30 | 32 | 34 | 40 |
| 5% Tensile Modulus, psi | * | 62 | 61 | 45 | 74 | 72 | 73 | 86 | 89 | 51 | 72 | 63 | 77 | 150 |
| 25% Tensile Modulus, psi | * | 180 | 150 | 200 | 240 | 240 | 310 | 320 | 350 | 280 | 300 | 310 | 360 | 500 |
| 50% Tensile Modulus, psi | * | 240 | 210 | 300 | 350 | 340 | 460 | 470 | 520 | 570 | 550 | 580 | 670 | 890 |
| 100% Tensile Modulus, psi | * | 290 | 280 | 400 | 460 | 420 | 600 | 610 | 650 | 790 | 740 | 770 | 910 | 1200 |
| Ultimate Tensile, psi | * | 5100 | 5200 | 6000 | 4500 | 5100 | 8500 | 9900 | 8500 | 3900 | 3400 | 3800 | 4900 | 8100 |
| Elongation at Break, % | * | 730 | 750 | 550 | 540 | 670 | 570 | 590 | 620 | 740 | 750 | 800 | 700 | 550 |
| Set (0/1 min) | * | 31/20 | 31/19 | 15/11 | 19/14 | 26/21 | 17/15 | 15/14 | 20/18 | 63/60 | 72/67 | 75/69 | 52/46 | 20/20 |

[1] Ratio isocyanate groups to hydroxyl groups
[2] Combined wt. % BDO and MDI
*Poor extrudable due to excessive tack; not testable

EXAMPLE 12

Selected polyurethanes from the above examples were tested for surface blocking by extruding a ribbon of the polyurethane, folding it upon itself once and placing it under a standard 5 pound weight about one inch in diameter for 5 minutes. Thereafter, the ribbon was pulled apart on an Istron Tensile Tester. The force required to unfold the ribbon is recorded in Table II below.

TABLE II

| Polyurethane (Example No.) | Initial Tack (newtons) | Tack After 24 Hours (newtons) |
|---|---|---|
| C | 22 | 3.5 |
| 6 | 1.9 | 0 |
| 7 | 0 | 0 |
| 8 | 0 | 0 |
| 9 | 0 | 0 |

The unsiliconized control (C) was more tacky and more difficult to handle in fabricating operations such as extrusion and injection molding than the polyurethanes of Examples 6-9.

EXAMPLE 13

Two polyurethane samples were prepared; Polyurethane A was prepared in accordance with the present invention using 4-3667 Fluid as the silicone diol and Polyurethane B was prepared using a silicone diol described in Rauner et al., U.S. Pat. No. 4,057,595. The latter diol was prepared as follows:

Into a 1 liter, 3-necked flask fitted with a stirrer, Dean-Stark trap and a water-cooled condenser was placed 135 gms of a hydroxyl end-blocked polymethylsiloxane having an average d.p. of 12 ((Me$_2$SiO) units, 180 gms of a polyether having the formula

HO—(CH$_2$CH$_2$O)$_{13}$—H and 241 ml of toluene. To this mixture was added 1.0 gm of Amberlyst 15, a sulfate functional condensation catalyst. The sample was heated to reflux and agitated for 5 hours. When it was cooled the solution was filtered and stripped to yield a siloxane-polyoxyethylene copolymer. FTIR (Fourier transform infra-red) analysis was in agreement with the structure.

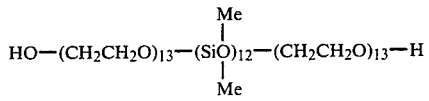

GPC analysis indicated a number average molecular weight of 2000. This compound has an equivalent weight approximately equal to that of 4-3667 Fluid.

Polyurethanes A and B were prepared by reacting the aforesaid silicone diols as described in Examples 1-11. Both polyurethanes contained 34% hard segment, 10% silicone diol, and 56% Terathane T-1000. Ribbons were then extruded from each of the polyurethanes and tensile strength measured. The ribbons were then subjected to a hydrolytic stability test wherein each ribbon was placed in a normal saline solution at 90° C. for 24 and 168 hours and tensile remeasured. The results are shown in Table III below:

TABLE III

| | % Tensile Retained | |
|---|---|---|
| | 24 Hours | 168 Hours |
| Ribbon A | 100 | 69 |

TABLE III-continued

| | % Tensile Retained | |
|---|---|---|
| | 24 Hours | 168 Hours |
| (Invention) Ribbon B (Comparison) | 76 | 44 |

EXAMPLE 14

Polyurethanes A and B from Example 13 were compared for clarity by measuring the transmittance of the films on a UV double beam spectrophotometer (Beckman model ACTA MIV). As standards for comparison, the transmittance of a glass microscope slide and a cloudy Parafilm were also measured. The results are shown in Table IV below. The values for Polyurethanes A and B are the average for three samples of each.

TABLE IV

| Wavelength | Polyurethane B | Polyurethane B | Glass | Parafilm |
|---|---|---|---|---|
| 750 | 80.2 | 40.1 | 91.4 | 57.7 |
| 700 | 77.9 | 34.6 | 91.4 | 52.5 |
| 650 | 76.0 | 29.1 | 91.6 | 48.8 |
| 600 | 74.3 | 24.3 | 91.8 | 46.0 |
| 550 | 72.4 | 19.3 | 92.0 | 43.0 |
| 500 | 69.6 | 14.5 | 92.0 | 39.7 |
| 450 | 65.8 | 9.78 | 92.3 | 35.6 |
| 400 | 60.7 | 6.02 | 92.5 | 31.1 |
| 380 | 56.4 | 4.59 | 92.0 | 29.1 |

The results show that Polyurethane A in accordance with the present invention possesses significantly better clarity than the comparison B. This makes the polyurethane of the present invention more desirable for use in catheters where high clarity is required in order to observe the fluids passing therethrough.

Having described the invention in detail and by reference to preferred embodiments thereof, it will be apparent that modifications and variations are possible without departing from the scope of the invention defined in the appended claims.

What is claimed is:

1. A soft, non-blocking, thermoplastic polyurethane, said polyurethane containing within the polymer chain thereof units of a siloxane-polyoxyalkylene block copolymer of the formula (I)

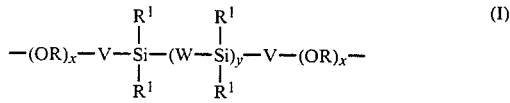

wherein x has a value of about 1 to 30; y has a value of about 1 to 200, R is an alkylene group having 2 to 4 carbon atoms; $R^1$ is selected from the group consisting of an alkyl group having 1 to 18 carbon atoms, a haloalkyl group having 1 to 18 carbon atoms, a phenyl group, a substituted phenyl group, and a phenylalkyl group; and V and W are divalent linking groups.

2. The polyurethane of claim 1 wherein said block copolymer units have the formula (II)

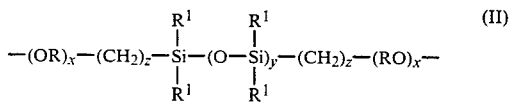

wherein x, y, R and $R^1$ are defined as in claim 1 and z is an integer of 2 or more.

3. The polyurethane of claim 2 wherein said polyurethane has a Shore A hardness of about 55 to 90.

4. The polyurethane of claim 3 wherein said polyurethane contains about 1 to 15% by weight of said block copolymer units.

5. The polyurethane of claim 4 wherein said polyurethane is the reaction product of a diisocyanate, a long chain polyether or polyester diol, a short chain diol having 2 to 6 carbon atoms, and a silicone diol of the formula (IV)

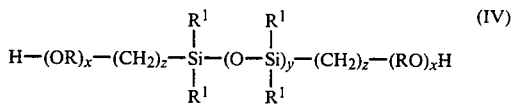

where x, y, z, R, and $R^1$ are defined as in claim 1.

6. The polyurethane of claim 5 wherein said diisocyanate and said short chain diol make up about 25 to 45 weight percent of said polyurethane.

7. The polyurethane of claim 6 wherein said long chain diol has a molecular weight of about 1000 to 3000.

8. The polyurethane of claim 7 wherein said silicone diol has a molecular weight of about 1200 to 6000.

9. The polyurethane of claim 8 wherein $R^1$ is an alkyl group.

10. The polyurethane of claim 9 wherein R represents an ethylene or butylene group.

11. The polyurethane of claim 10 wherein said long chain diol is a polyether diol.

12. The polyurethane of claim 10 wherein said long chain diol is a polyester diol.

13. The polyurethane of claim 11 wherein said diisocyanate is an alicyclic or an aromatic diisocyanate.

14. The polyurethane of claim 12 wherein said diisocyanate is an alicyclic or aromatic diisocyanate.

15. The polyurethane of claim 3 wherein said polyurethane has a Shore A hardness of about 60 to 80.

16. The polyurethane of claim 6 wherein said diisocyanate and short chain diol make up about 27 to 36 weight percent of said polyurethane.

17. A soft, non-blocking, thermoplastic polyurethane, said polyurethane having a Shore A hardness of about 55 to 90 and being the reaction product of an aromatic or alicyclic diisocyanate, a short chain diol having 2 to 6 carbon atoms, a long chain polyether or polyester diol and a silicone diol of the formula (IV)

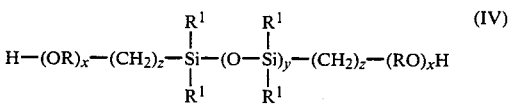

where x has a value of about 1 to 30, y has a value of about 10 to 30, z is 2 to 4, R represents an ethylene or butylene group, and $R^1$ represents an alkyl group, said silicone diol constituting about 5 to 10 weight percent of said polyurethane, said diisocyanate and said short chain diol constituting about 27 to 36 weight percent of said polyurethane, said silicone diol having a molecular weight in the range of about 1200 to 6000, and said long chain diol constituting the balance of said polyurethane and having a molecular weight in the range of about 1000 to 3000.

18. A process for making a soft, non-blocking, thermoplastic polyurethane which comprises:
(a) forming a diol mixture including a short chain diol, a long chain polyether or polyester diol, and a silicone diol of the formula (IV)

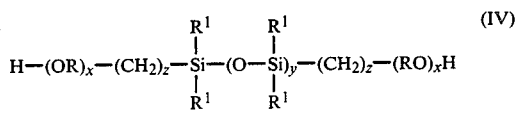

where x has a value of about 1 to 30, y has a value of about 1 to 200, z is an integer of 2 or more, R is an alkylene group having 2 to 4 carbon atoms, and $R^1$ is selected from the group consisting of an alkyl group having 1 to 18 carbon atoms, a haloalkyl group having 1 to 18 carbon atoms, a phenyl group, a substituted phenyl group, and a phenylalkyl group,
(b) adding a diisocyanate to said diol mixture,
(c) stirring said mixture to prevent separation thereof while said mixture reacts and forms a polyurethane, and
(d) recovering said polyurethane.

19. The process of claim 18 wherein said diisocyanate is an aromatic or alicyclic diisocyanate.

20. The process of claim 19 wherein said silicone diol is reacted in an amount of about 1 to 15 weight percent and said diisocyanate and said short chain diol are reacted in a combined amount of about 25 to about 45 weight percent.

21. A process for making a soft, non-blocking, thermoplastic polyurethane which comprises:
(a) reacting a diisocyanate with a silicone diol of the formula (IV) to form an isocyanate terminated diol,

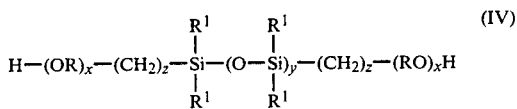

where x has a value of about 1 to 30, y has a value of about 1 to 200, z is an integer of 2 or more, R is an alkylene group having 2 to 4 carbon atoms, and $R^1$ is selected from the group consisting of an alkyl group having 1 to 18 carbon atoms, a haloalkyl group having 1 to 18 carbon atoms, a phenyl group, a substituted phenyl group, and a phenylalkyl group,
(b) reacting said isocyanate terminated diol with a mixture of a long chain diol and a short chain diol to form a polyurethane, and
(c) recovering said polyurethane.

22. A medical device formed from the polyurethane of claim 3.

23. The medical device of claim 22 wherein said device is a tubing.

* * * * *